United States Patent [19]
Gneupel

[11] 3,718,114
[45] Feb. 27, 1973

[54] LENGTH MEASURING INSTRUMENT
[76] Inventor: Artur Gneupel, 295 Frohburgstrasse, Zurich, Switzerland
[22] Filed: March 27, 1970
[21] Appl. No.: 23,352

[30] Foreign Application Priority Data
Mar. 25, 1969    Switzerland ...................... 4527/69

[52] U.S. Cl. ............................. 116/129, 33/147 I
[51] Int. Cl. ........................................ G09f 9/00
[58] Field of Search..116/115, 115.5, 129; 33/147 R, 33/147 I, 141 B, 125; 235/91, 117, 139, 103, 95

[56] References Cited

UNITED STATES PATENTS

| 443,869 | 12/1890 | Riglander | 33/147 I |
|---|---|---|---|
| 1,621,526 | 3/1927 | Culell | 33/147 I |
| 2,325,767 | 8/1943 | Glouton | 33/147 I |
| 2,656,108 | 10/1953 | Hamelink | 235/139 X |
| 2,846,769 | 8/1958 | Colont | 33/125 |
| 3,458,127 | 7/1969 | Hermann | 235/117 X |

Primary Examiner—Louis J. Capozi
Attorney—Anderson, Luedeka, Fitch, Even and Tabin

[57] ABSTRACT

A length measuring instrument, such as a slide caliper, a height tracer or sliding compass comprises a slide movable along a slide carrier and provided with a counter mechanism for direct indication and read-out of the measured values. The counter mechanism comprises a plurality of rotatable figure drums or counters driven by a gear having a pinion mounted on the input shaft of the gear and meshing with a rack extending longitudinally of the slide carrier. Two of said counters indicating the smallest and next higher digit of the measured values are independently and permanently connected for rotation by said input shaft, while the remaining counters are driven by the intermediary of a stepping mechanism from said counter corresponding to the next higher digit.

3 Claims, 3 Drawing Figures

PATENTED FEB 27 1973  3,718,114

LENGTH MEASURING INSTRUMENT

This invention relates to a length measuring instrument having a slide, such as for example a slide caliper, sliding compass, height tracer, etc. which slide comprises a counter mechanism for direct indication and reading of the measured values, the drive of the counter comprising a plurality of figure drums or counters being effected by the intermediary of a gear on the input shaft of which is fixed a driving wheel adapted to be rotated by a slide carrier.

In known length measuring instruments of this kind, having slides for digital read-out, the counter mechanism consists of a commercially available construction in which the first counter for the smallest digit remains permanently in driving connection with the driving or input shaft, while all other counters are operated by said first counter by the intermediary of stepping mechanisms.

Since in an instrument capable of indicating measuring values of a certain precision, for example having the smallest counter indicating one tenth of one millimeter, the second to last counter, namely the millimeter counter, is operated very often there result shocks which affect the measuring precision and subject the counting mechanism to relatively heavy stress. Moreover, owing to the stepping mechanisms, the slide cannot be operated always with the desired speed.

It is an object of the present invention to provide a length measuring instrument having a slide of the mentioned kind, which avoids the drawbacks of known instruments.

The length measuring instrument according to the invention comprises a slide, a counter mechanism for direct indication and read-out of the measured values, said counter mechanism including a plurality of rotatable counters, a driving gear for said counters, said driving gear having an input shaft, a pinion on said shaft, a slide carrier provided with rack means drivingly engaging said pinion, and means for establishing a permanent driving connection between said pinion and two of said rotatable counters corresponding to the smallest and the next higher digit of the measured values.

Two examples of a measuring instrument according to the invention are illustrated in the accompanying drawings, in which.

Figure 1:
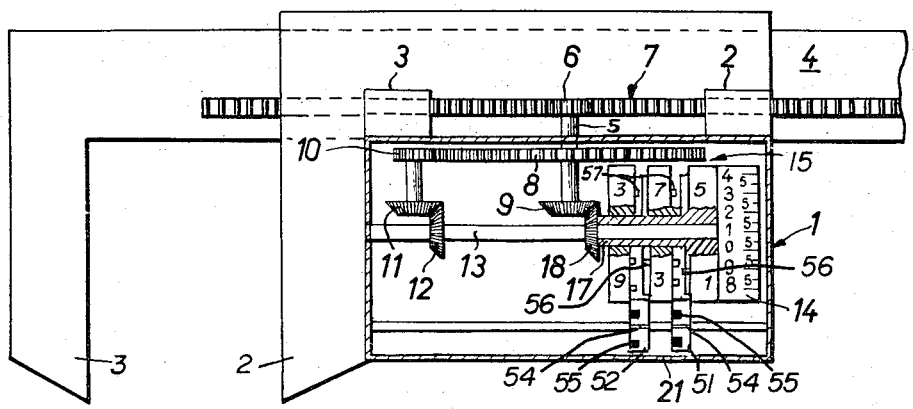
FIG. 1 shows diagrammatically a horizontal section through a slide placed on the slide carrier bar or tongue of a slide caliper.

The length measuring instrument represented in FIG. 1 comprises a casing 1 forming a unit together with a caliper arm 2 and which is slidably engaged on a bar 4 provided with a second caliper arm. The input shaft 5 projects out of the casing 1. A gear pinion 6 is fixed to the outer end of the shaft. The pinion 6 meshes with a precisely machined gear rack 7 formed on the slide carrier bar 4.

The portion of the shaft 5 within the casing 1 carries two further gear wheels 8 and 9. The shaft 13 of a counter 14 which corresponds to the smallest digit of the measured values of the counter mechanism 15 is driven by the gears 8, 10, 11, 12, the counter 14 thus being in permanent driving connection with the input shaft 5. The counter 14 in the represented example carries the values of the one-tenth millimeter indication. The corresponding graduation obviously can still be divided into smaller units, however, the one-tenth millimeter graduation is digitally readable. A hollow shaft 17 is mounted on the shaft 13 and is drivingly connected with the counter 16 carrying the next higher measuring digits. The end of the shaft 17 carries a bevel gear 18 meshing with the bevel gear 9 already mentioned. The counter 16 accordingly is also in permanent driving connection with the input shaft 5. The shaft 17 carries two further figure wheels or counters 19 and 20 which are driven by the counter 16 by the intermediary of a stepping mechanism 21. This stepping mechanism comprises two indexing pinions 51 and 52 carried on a common axis 53 which is rotatably mounted by its ends in the casing 1.

Each pinion 51 and 52 is provided with four teeth 54 uniformly spaced on and projecting from the circumferential surface of the pinions. These teeth 54 extend the whole width of the respective circumferential surface. Each pinion further is provided with four equally spaced teeth 55 only extending over the left half of the circumferential surface of the respective pinion. Each shorter tooth 55 is located between two longer teeth 54. The left side of the figure wheels 16 and 20 is provided with a single laterally projecting tooth 56 which only can engage with the longer tooth 54 of the adjacent pinions 51 and 52, respectively. This engagement always takes place after one complete revolution of the figure wheels 16 and 20. The right hand face of each figure wheel 19 and 20 is provided with ten teeth 57 which engage with both teeth 54 and 55 of the pinions 51 and 52, respectively.

When for example the figure wheel 16 effects one complete revolution, its tooth 56 engages one of the longer teeth 54 of the pinion 51 and causes rotation of this pinion through one quarter of one revolution. Since the teeth of the pinion 51 remain in constant engagement with the teeth 57 of the figure wheel 20 at the left side of the pinion 51, also this wheel 20 turns, but only through one tenth of its circumference, so that a further figure on the circumference thereof will appear in reading position. Owing to this novel drive of the counter mechanism 15 an increased measuring precision is obtained and the counter mechanism is saved from wear and strain. Moreover, the slide can be moved more rapidly.

Figure 2:
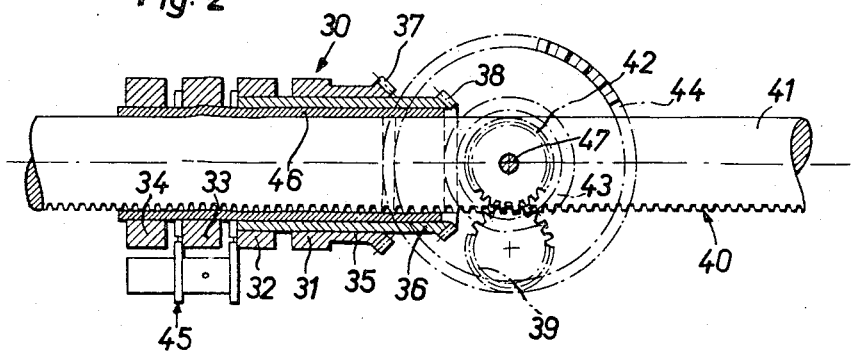
FIG. 2 is a vertical section through the diagrammatically represented gear and counter mechanism of a modified instrument according to the invention.
Figure 3:
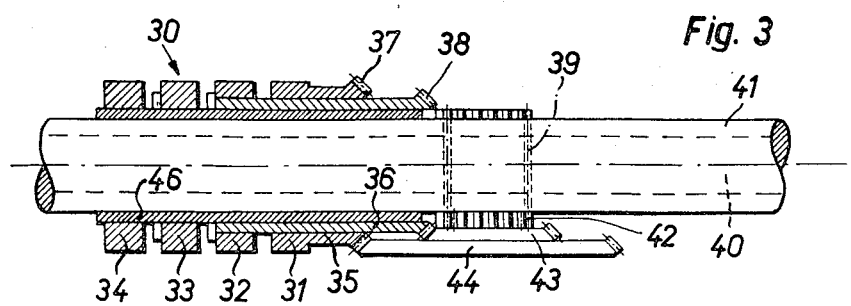
FIG. 3 is a horizontal sectional view of the construction according to FIG. 2.

In the gear and counter mechanism 30 according to FIGS. 2 and 3, also four figure drums or counters 31, 32, 33 and 34 are provided. The counters 31 and 32 comprise sleeve extensions 35 and 36 formed as hollow shafts, having bevel gears 37 and 38, respectively, arranged at their free ends.

A pinion 39 is provided for meshing with a precisely machined rack gear 40 on the caliper bar 41, which is formed with a circular cross section. Two coaxial bevel gears 43 and 44 are mounted on a shaft 47 driven by a further gear wheel 42 on the shaft 47 and meshing with the pinion 39, The bevel gears 43 and 44 mesh with the bevel gears 38 and 37, respectively, in order to drive the counters 32 and 31, respectively, with the required gear ratio. The counters 33 and 34 are driven by the counter 32 by the intermediary of a stepping mechanism 45.

The counters 31 to 34 are mounted on a common bearing sleeve 46 having an internal diameter to snugly fit with a gliding seat on the cylindrical caliper bar 41. The entire gear and the counter mechanism 30 are arranged to be contained in a casing (not represented) to which is fixed the sleeve 46, so that the casing can be slipped on the caliper bar 41 as a unit.

In both examples shown in the drawings, two identical graduated scales for indication of the measuring values can be arranged in series along the circumference of each figure drum or counter. It is accordingly possible to provide two reading windows arranged symmetrically with respect to the axis of the counters, in which windows the same measuring values can be digitally read, so that for example in the case of a slide caliper, the indications can be read on both sides of the instrument.

I claim:

1. A length measuring instrument comprising a slidable casing, a counter mechanism for direct indication and readout of measured values, said counter mechanism including a plurality of rotatable counters, a driving mechanism for said counters, said driving mechanism having an input shaft, a pinion on said shaft, means carrying said casing and having a rack means drivingly engaging said pinion, first and second gear wheels carried by said input shaft and each drivingly connected to one of said plurality of rotatable counters, one of said counters indicating the smallest digit and the other of said counters indicating the next higher digit of the measured values, said counters having coaxially disposed shafts with one of said shafts being hollow and telescoped on the other shaft.

2. An instrument according to claim 1, in which additional counters are mounted on said hollow shaft.

3. An instrument according to claim 1, in which a stepping gear is provided to drive said additional counters in response to a predetermined rotational movement of said other counter.

* * * * *